Dec. 22, 1942.   H. J. DE N. McCOLLUM ET AL   2,306,134
FUEL SUPPLY SYSTEMS FOR AUTOMOBILE HEATERS
Filed Oct. 2, 1940
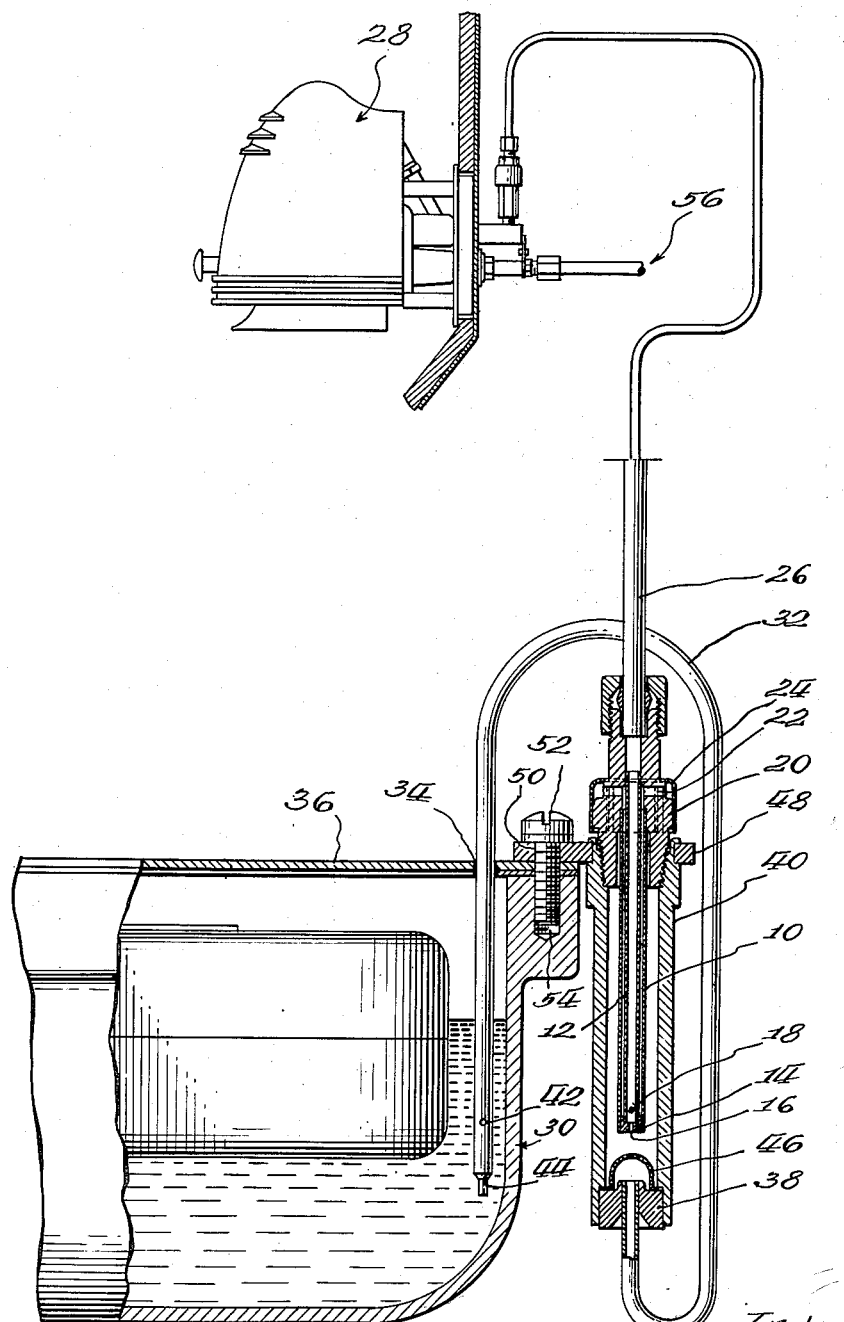

Patented Dec. 22, 1942

2,306,134

UNITED STATES PATENT OFFICE 2,306,134

FUEL SUPPLY SYSTEM FOR AUTOMOBILE HEATERS

Henry J. De N. McCollum and Thomas F. Spackman, Chicago, Ill.; said Spackman assignor to Stewart-Warner Corporation, Chicago, Ill., a corporation of Virginia Application October 2, 1940, Serial No. 359,418

7 Claims. (Cl. 158—38)

Our invention relates generally to automobile heaters of the internal combustion type, and more particularly to improvements in the fuel supply means therefor.

It is an object of our invention to provide an improved fuel feeding device for automobile heaters of the internal combustion type.

A further object is to provide an improved auxiliary fuel reservoir for the supply of liquid fuel to an automobile heater of the above-mentioned type.

A further object is to provide a novel, improved and readily installed device for supplying fuel to an automobile heater of the aforesaid type.

Other objects will appear from the following description, reference being had to the accompanying drawing, which shows a cross section of the float chamber of an automobile carbureter and a cross section of the heater fuel supply device, which is the subject of this application. It also shows, on a reduced scale, an automobile heater associated therewith.

The assembly for withdrawing the fuel from a fuel reservoir is disclosed in the co-pending application of Henry J. DeN. McCollum, Serial No. 177,075, filed November 29, 1937. This assembly comprises two concentric tubes 10, 12, closed at the lower end with a plug 14 through which a hole 16, approximately .009 inch in diameter, is drilled. This hole 16 extends into the inner tube 12. In the wall and near the lower end of inner tube 12, there is drilled a hole 18, .025 inch in diameter. This hole 18 connects the inside of tube 12 with the space between the concentric tubes 10, 12. The upper end of the outer tube 10 extends a short distance into a plug 20 being preferably soldered therein. The lower portion of this plug 20 is externally threaded and screwed into the cover of the reservoir from which fuel is drawn. The upper portion of this plug 20 may be made hexagonal in shape to facilitate its installation and removal. The upper end of the inner tube 12 is sealed, by solder, or the like, in the upper portion of this plug 20. Holes 22 are drilled in the plug 20 to provide inlets for the outside air to the space between the concentric tubes 10, 12. These holes 22 are covered by a slotted cylindrical collar 24 which prevents the entrance of foreign bodies to the space between the concentric tubes 10, 12. Plug 20 is attached to the fuel line 26 of the heater 28 by a suitable fitting.

When the heater is not in operation for a short time, the fuel flows, by gravity, through holes 16 and 18 into the space between the concentric tubes 10, 12. In starting the heater this fuel is drawn from between the concentric tubes 10, 12 through the hole 18 before any air is allowed to enter the inner tube 12. This results in a rich initial mixture which facilitates the ignition of the internal combustion heater.

Under former practice the above fuel withdrawal assembly was installed in the float chamber of the automobile carbureter. This necessitated the drilling and tapping of a hole in the cover of the carbureter float chamber sufficient in size to accommodate the threaded plug 20. As this float chamber cover usually is thin and made of a soft metal suitable for die casting, difficulty was occasionally experienced in forming satisfactory threads. Sometimes a careless mechanic would drill through the body of the carbureter float, disabling the automobile until the damage was repaired. To avoid these dangers attending installation of the fuel withdrawal device in the carbureter, a float controlled auxiliary fuel reservoir was sometimes provided. In seasons of the year in which the heater was not in use, fuel continuously evaporated from the auxiliary chamber leaving a residue of sediment and gum which at times interfered with the satisfactory operation of the fuel withdrawal assembly and the float valve of the auxiliary reservoir.

Our present invention alleviates these difficulties by providing an auxiliary reservoir which may be installed with relatively slight alteration of the carbureter float chamber cover and which will not remain filled with the fuel when the heater has been out of operation for a substantial length of time.

Referring to Fig. 1, fuel is siphoned from the carbureter float chamber 30 by means of a tube 32 of a diameter in the order of one-sixteenth of an inch and made of copper or other suitable material.

This tube 32 leads from below the level of the fuel in the float chamber 30, upward through a drilled hole 34 near the edge of the cover 36 of the float chamber 30. This hole 34 is preferably made of a size which will fit the tube 32 closely. After passing through the cover 36, the tube is bent back on itself and extends downward to a point approximately level with the bottom of the float chamber 30, where the tube 32 is again bent back on itself and extends upward through the center of a plug 38. This plug 38 is attached by soldering or other suitable means into the bottom of the auxiliary reservoir 40. The end of the tube 32 which extends into the float chamber 30 is provided with a suitable plug 44. Above this plug and below the fuel level in the float chamber 30, a small hole 42 is drilled in the tube 32. This construction prevents water and sediment in the bottom of the float chamber 30 from being drawn into the auxiliary reservoir 40. A fine screen 46 is placed at the bottom of the auxiliary reservoir 40 to prevent the passage of water and other foreign substances.

The auxiliary reservoir 40 is provided at its upper end with a bracket 48 for attaching it to the carbureter float chamber 30. One end of this bracket 48 projects onto the top of the float chamber 30 and is provided with a drilled hole 50. A machine screw 52 extends through this hole 50 into one of the threaded holes 54, originally provided for the screw which held the float chamber cover 36 to the float chamber 30.

As the siphon is attached to the automobile carbureter, it is usually positioned near the engine exhaust manifold. When the engine operates at its normal running temperature and the heater is not in operation, the heat of the exhaust manifold combined with other engine heat causes the lighter hydrocarbons in the gasoline to vaporize, causing vapor lock in the siphon tube 32. The heating of the siphon is facilitated by the relatively small diameter and the good heat conducting properties of the siphon tube. In the warmer seasons of the year when the heater is not in use, this vapor lock occurs more quickly than in the colder seasons. When the heater is in operation flow of the fuel through the siphon has a cooling effect which prevents this vaporization. No liquid fuel will flow into the auxiliary reservoir through the vapor-locked siphon. Therefore, after the siphon has vapor-locked and the small quantity of fuel present in the bottom of the auxiliary reservoir has evaporated, there will be no further evaporation of liquid fuel from the auxiliary reservoir and there will not be a continuous formation of gum and sediment which would interfere with the operation of the fuel withdrawal assembly.

As the only necessary alteration of the carbureter float chamber is the drilling of the small hole 34 near the edge of its cover, the device may be easily and quickly installed by any ordinary mechanic. Previously, incompetent installation of the fuel supply device was a frequent cause of dissatisfaction among users of internal combustion automobile heaters. Our invention substantially removes this cause.

In operation, the outlet line 56 of the heater 28 is attached to the intake manifold of the engine of the automobile. This provides a vacuum which acts through the heater 28 and causes the flow of fuel through the fuel supply line 26. Gasoline is drawn into the center tube 12 and through hole 16. Air passes through holes 22 in the plug 20, through the space between the concentric tubes 10, 12, and through hole 18 into the inner tube 12. This air mixes with the fuel, decreasing its specific gravity so that it may more readily be raised to the level of the heater 28, and facilitating its carburetion. Should there be no fuel in the auxiliary reservoir 40 when the heater is put in operation, air will flow through hole 16, causing a vacuum in the auxiliary reservoir. This vacuum will draw fuel into the siphon tube 32, thereby filling the tube and causing fuel to flow by siphoning action. Thus, when the siphon tube 32 vapor locks the vacuum causes it to refill.

The fuel supply device which forms the subject of this application is cheaply, quickly and easily installed by a relatively unskilled mechanic. It is free from clogging by impurities in the fuel or by the residue formed by its evaporation. When used with an internal combustion automobile heater so constructed that its fuel supply line operates below atmospheric pressure, it automatically goes into operation and will automatically free itself of vapor lock.

While we have shown and described preferred embodiments of our invention, it will be readily understood by those skilled in the art that variations may be made in the construction disclosed, without departing from the basic features of our invention. We, therefore, do not wish to be limited to the precise construction disclosed, but wish to include within the scope of our invention all such modifications and variations which will readily suggest themselves.

Having thus described our invention, what we claim as new and desire to secure by Letters Patent of the United States is:

1. In apparatus of the class described, the combination of an internal combustion type of heater adapted for use on an automobile having an internal combustion engine, a carburetor for said engine, a float bowl forming part of said carburetor, an auxiliary fuel reservoir at substantially the same level as said float bowl, a siphon connecting said auxiliary reservoir with said float bowl, and means connecting said auxiliary reservoir with said heater.

2. An apparatus of the class described, the combination of an internal combustion type of heater adapted for use on a vehicle having an engine, a vessel containing fuel for said engine, an auxiliary fuel reservoir for said heater at substantially the same level as said vessel, a siphon supplying the auxiliary fuel reservoir with fuel from said vessel, and suction means for withdrawing fuel from said auxiliary reservoir and priming said siphon.

3. In apparatus of the class described, the combination of an internal combustion type of heater adapted for use on an automotive vehicle, having an engine, a carburetor for said engine, said carburetor including a float bowl, an auxiliary fuel reservoir at substantially the same level as the float bowl of the carburetor, a siphon supplying said auxiliary reservoir with fuel from said float bowl, suction means for withdrawing fuel from said auxiliary reservoir for use in said heater, and a bracket for attaching said auxiliary fuel reservoir to said carburetor float bowl.

4. In apparatus of the class described, the combination of an internal combustion type of heater adapted for use on an automotive vehicle having an engine, a carburetor having a float bowl for supplying fuel to said engine, an auxiliary fuel reservoir at substantially the same level as the fuel in said float bowl, a siphon tube of a diameter in the order of one-sixteenth inch for supplying said auxiliary reservoir with fuel from said float bowl, means for obtaining fuel from said auxiliary reservoir for use in said heater, and a bracket for attaching the auxiliary fuel reservoir to said carburetor float bowl.

5. In apparatus of the class described, the combination of an internal combustion type of heater, a container providing a fuel supply for mechanism in which said fuel is burned and gives off heat, an auxiliary fuel reservoir positioned at substantially the same level as the normal fuel level in said container, a siphon tube for supplying liquid fuel from said container to said reservoir, said tube being of relatively small diameter, being constructed of heat conducting material, having an inlet end adapted to be inserted through a small hole drilled through a wall of said fuel container above the normal fuel level therein and being so constructed and positioned that it will empty itself when out of operation as a result of the heat given off by said mechanism, and suction means for removing fuel from said auxiliary reservoir for use in said heater.

6. In apparatus of the class described, the combination of a vacuum operated automobile heater of the internal combustion type, a carburetor for the automobile engine, said carburetor having a float bowl, a closed auxiliary fuel reservoir at substantially the same level as said float bowl, a siphon tube of heat conducting material with a diameter in the order of one-sixteenth inch for supplying said auxiliary reservoir with fuel from said float bowl, the inlet end of said siphon tube being closed and extending into the fuel in said float bowl, said siphon tube having a small hole near the closed end thereof and below the fuel level in said float bowl, said siphon tube extending upward from said float bowl through a closely fitting small hole near the edge of the cover of said float bowl, being bent back on itself in a downward direction and being connected to said auxiliary reservoir at a level below that of the fuel in said float bowl, and vacuum operated means connected to said auxiliary reservoir to draw fuel therefrom to said heater and to prime said siphon.

7. In apparatus of the class described, the combination of an engine carburetor, an auxiliary fuel reservoir positioned at substantially the same level as the fuel level in said carburetor, an internal combustion type of heater connected to said auxiliary reservoir, a siphon tube for supplying fuel from said fuel container to said auxiliary reservoir, said tube having a diameter such that the flow of fuel through the tube during the normal operation of said heater is sufficient to cool the tube and prevent the fuel passing therethrough from vapor-locking under the influence of heat from said engine, and suction means for removing fuel from said reservoir for use in said heater and in priming said suction tube.

HENRY J. DeN. McCOLLUM.
THOMAS F. SPACKMAN.